(12) United States Patent
Tsang et al.

(10) Patent No.: US 12,206,703 B2
(45) Date of Patent: Jan. 21, 2025

(54) ASSET ANOMALY DETECTION BASED ON CROSS ORGANIZATIONAL ASSET DATA MODELING

(71) Applicant: Rapid7, Inc., Boston, MA (US)

(72) Inventors: Richard Tsang, Toronto (CA); Fatemeh Kazemeyni, Toronto (CA); Evgeniya Barkova, Toronto (CA)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 18/519,175

(22) Filed: Nov. 27, 2023

(65) Prior Publication Data

US 2024/0129335 A1   Apr. 18, 2024

Related U.S. Application Data

(63) Continuation of application No. 16/548,068, filed on Aug. 22, 2019, now Pat. No. 11,909,759.

(51) Int. Cl.
*H04L 9/40* (2022.01)
*G06N 7/01* (2023.01)
*G06N 20/00* (2019.01)

(52) U.S. Cl.
CPC .......... *H04L 63/1441* (2013.01); *G06N 7/01* (2023.01); *G06N 20/00* (2019.01)

(58) Field of Classification Search
CPC .......................... H04L 63/1441; G06N 20/00
See application file for complete search history.

(56) References Cited

U.S. PATENT DOCUMENTS

| | | | |
|---|---|---|---|
| 10,771,489 B1* | 9/2020 | Bisht | G06N 20/00 |
| 2012/0041575 A1* | 2/2012 | Maeda | G05B 23/024 |
| | | | 700/79 |
| 2012/0166317 A1* | 6/2012 | Karnik | G06Q 10/087 |
| | | | 705/28 |
| 2015/0082432 A1* | 3/2015 | Eaton | H04L 43/16 |
| | | | 726/23 |
| 2019/0197411 A1* | 6/2019 | Di | G06N 5/02 |
| 2020/0134083 A1* | 4/2020 | Elliman | G06F 3/0482 |
| 2020/0177633 A1* | 6/2020 | Shivamoggi | G06F 18/23213 |
| 2020/0267057 A1* | 8/2020 | Garvey | H04L 41/0816 |

* cited by examiner

*Primary Examiner* — Hee K Song
(74) *Attorney, Agent, or Firm* — Ashwin Anand; Lei Sun (57) ABSTRACT

Methods and systems for identifying assets for review. The methods described herein involve generating an organizational statistical model describing assets associated with a first organization and generating a report identifying a discrepancy between the organizational statistical model and an identified asset of the first type associated with the first organization.

21 Claims, 6 Drawing Sheets

ASSET ANOMALY DETECTION BASED ON CROSS ORGANIZATIONAL ASSET DATA MODELING

This Application claims priority under 35 U.S.C. § 120 and is a continuation of U.S. patent application Ser. No. 16/548,068, filed Aug. 22, 2019, titled "Identifying Assets for Review" the entire contents of which are incorporated herein by reference in its entirety.

TECHNICAL FIELD

Embodiments described herein relate to methods and systems for monitoring networks and, more particularly but not exclusively, to methods and systems for identifying network assets for review.

BACKGROUND

Due to their prevalence in today's society, the internet and other types of networks have become a hub for criminal activity. Often times cyber-criminals or other threat actors attempt to install or otherwise deploy harmful applications on unprotected systems. Once a threat actor obtains access to a targeted system or device, they may perform further actions such as stealing data, escalating their privileges, or the like.

Recognizing and prioritizing network assets that are at risk is becoming increasingly difficult as the amount of vulnerabilities, malware, and exploits continue to rise. For example, every year the number of CVEs (common vulnerabilities and exposures) increases, as does the number of general software products.

Existing vulnerability detection techniques do not scale well with the ever-increasing amount of threats. Additionally, these existing techniques are inherently reactive in nature, and only recognize that an asset is infected with malware or the subject of malicious activity after the fact.

A need exists, therefore, for systems and methods that more effectively identify assets to be at risk for review.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method of identifying assets for review. The method includes generating, using a processor executing instructions stored on memory, an organizational statistical model describing assets associated with a first organization, wherein the organizational statistical model includes at least one cluster associated with a plurality of assets of a first type; and generating, using the processor, a report identifying a discrepancy between the organizational statistical model and an identified asset of the first type associated with the first organization.

In some embodiments, the method further includes generating, using the processor, a cross-organizational statistical model, wherein the cross-organizational statistical model describes a plurality of assets having a plurality of asset types and associated with a plurality of organizations. In some embodiments, the cross-organizational statistical model clusters assets of the same type together. In some embodiments, the method further includes confirming the discrepancy based on a comparison between the identified asset of the first type and the cross-organizational statistical model. In some embodiments, the method further includes dismissing the discrepancy based on a comparison between the identified asset of the first type and the cross-organizational statistical model.

In some embodiments, the method further includes receiving organizational asset data at an interface and generating the organizational statistical model includes applying, using the processor, a clustering machine learning algorithm to organize the organizational asset data into a plurality of clusters, each cluster associated with a plurality of assets of the same type. In some embodiments, the organizational asset data is delivered at scheduled intervals. In some embodiments, the organizational asset data is configuration data retrieved from a device on a network associated with the first organization.

In some embodiments, the method further includes assigning a benchmark status to an asset associated with the first organization to be used to detect anomalies on the network.

In some embodiments, the method further includes implementing at least one threat mitigation procedure to address the at least one discrepancy.

In some embodiments, the method further includes generating a report of installed assets utilizing the organizational statistical model.

According to another aspect, embodiments relate to a system for identifying assets for review. The system includes an interface for at least receiving organizational asset data related to a first organization; and a processor executing instructions stored on memory and configured to generate an organizational statistical model describing assets associated with a first organization, wherein the organizational statistical model includes at least one cluster associated with a plurality of assets of a first type, and generate a report identifying a discrepancy between the organizational statistical model and an identified asset of the first type associated with the first organization.

In some embodiments, the processor is further configured to generate a cross-organizational statistical model, wherein the cross-organizational statistical model describes a plurality of assets having a plurality of asset types and associated with a plurality of organizations.

In some embodiments, the cross-organizational statistical model clusters assets of the same type together. In some embodiments, the processor is further configured to confirm the discrepancy based on a comparison between the identified asset of the first type and the cross-organizational statistical model. In some embodiments, the processor is further configured to dismiss the discrepancy based on a comparison between the identified asset of the first type and the cross-organizational statistical model.

In some embodiments, the processor generates the organizational statistical model by applying a clustering machine learning algorithm to organize the organizational asset data into a plurality of clusters, each cluster associated with a plurality of assets of the same type. In some embodiments, the organizational asset data is delivered at scheduled intervals. In some embodiments, the organizational asset data is configuration data retrieved from a device on a network associated with the first organization.

In some embodiments, the processor is further configured to assign a benchmark status to an asset associated with the first organization to be used to detect anomalies on the network.

In some embodiments, the processor is further configured to implement at least one threat mitigation procedure to address the at least one discrepancy.

In some embodiments, the processor is further configured to generate a report of installed assets utilizing the organizational statistical model.

According to yet another aspect, embodiments relate to a method of monitoring a network. The method includes receiving organizational asset data related to a first organization, wherein the organizational asset data includes data regarding a plurality of assets of a variety of types; generating an organizational statistical model related to the first organization by applying a clustering machine learning algorithm to the organizational asset data to cluster the plurality of assets into clusters, wherein assets of the same type are clustered into the same cluster; receiving cross-organizational asset data related to at least a second organization, wherein the cross-organizational asset data includes data regarding a plurality of assets of a variety of types associated with at least the second organization; generating a cross-organizational statistical model related to at least the second organization by applying the clustering machine learning algorithm to the cross-organizational asset data to cluster the plurality of assets associated with at least the second organization, wherein assets of the same type are clustered into the same cluster; comparing the organizational statistical model with the cross-organizational statistical model; detecting at least one discrepancy between a first asset of a first type that is associated with the first organization and at least one second asset associated with the second organization, wherein the second asset associated with the second organization is of the first type; and generating a report summarizing the at least one detected discrepancy.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As discussed above, existing vulnerability detection techniques do not scale well to accommodate the ever-increasing amount of new threats and malware. Additionally, these existing techniques are generally focused on scanning devices already known to be the victims of malicious activity.

The systems and methods described herein instead detect when assets are configured in a way that is unusual or otherwise anomalous. The embodiments described herein provide a means of prioritizing and understanding an organization's security posture based on meaningful differences in, e.g., the configuration or behavior of network assets and baseline expectations. These differences represent "potential risk," rather than "hard risk" (e.g., risk associated with an asset already known to be the victim of malicious activity). While real risk may still exist within an organization, the systems and methods described herein can quickly mitigate potential risk and, as a result, lessen the overall management of an organization's security posture.

The systems and methods described herein may use any one or more of agent-collected data and cross-organizational models to identify potential anomalous assets within clusters of related assets. Data collected by agents installed on or otherwise in communication with network assets may be used to generate statistical models for each cluster of related assets. That is, assets that are similar to each other may be grouped in a cluster of other, similar network assets.

Accuracy and confidence of the anomaly detection may increase through additional verification using unsupervised machine learning within each organization. The accuracy and confidence may further be improved by referencing cross-organizational data. Also, the systems and methods described herein allow users to provide feedback (e.g., to confirm or override a classification) to achieve flexibility and customization of the generated models.

Accordingly, the systems and methods described herein incorporate expectations of particular assets. These expectations may be based on data associated with assets of a single organization as well as data associated with assets of multiple organizations.

The systems and methods described herein achieve a number of advantages in the field of network security. For example, the systems and methods herein use already-collected agent data to achieve a lower "mean-time to observation," use machine learning techniques to cluster assets within an organization to identify anomalies, use statistical models within an organization to maintain truth within the organization and to honor the various ways organizations operate, use machine learning across organizations to add weight to findings from statistical models to track an organization's security posture compared to other organizations, and use "golden" designations of assets as a means of establishing baselines.

Figure 1:
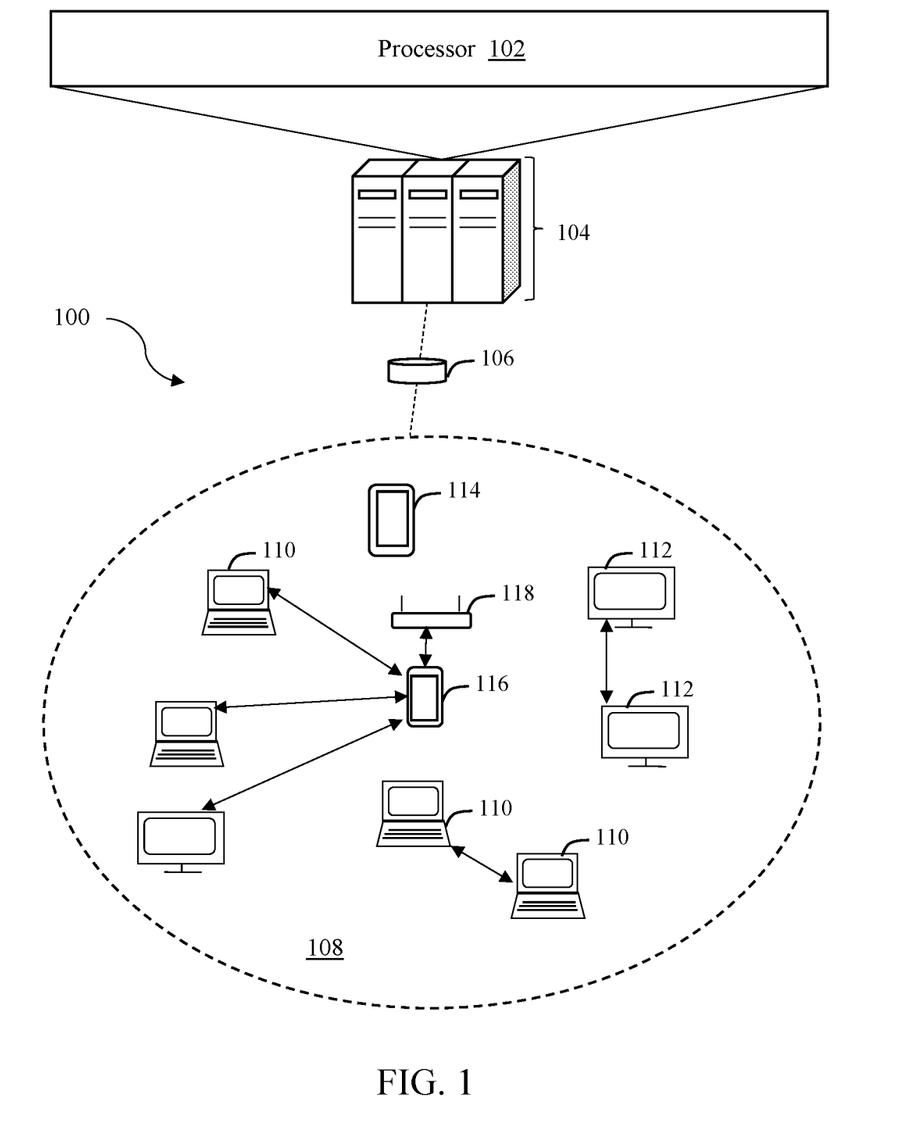
FIG. 1 illustrates an exemplary network architecture to identify assets for review in accordance with one embodiment.

FIG. 1 illustrates an exemplary network architecture 100 to identify assets for review in accordance with one embodiment. As seen in FIG. 1, the architecture 100 may include a processor 102 in operable communication with one or more servers 104, which may be in further communication with a router 106 and an organization's network 108.

The organization's network 108 may include a plurality of different types of devices, components, or assets (for simplicity, "assets"). These assets may include, but are not limited to, laptops 110, PCs 112, tablets 114, mobile devices 116, wireless routers 118, telephones, printers, firewalls, or the like. This list is only exemplary, and other assets in addition to or in lieu of those mentioned here may be considered and analyzed in accordance with the embodiments described herein. The type of assets considered may also depend on the type of organization.

Figure 2:
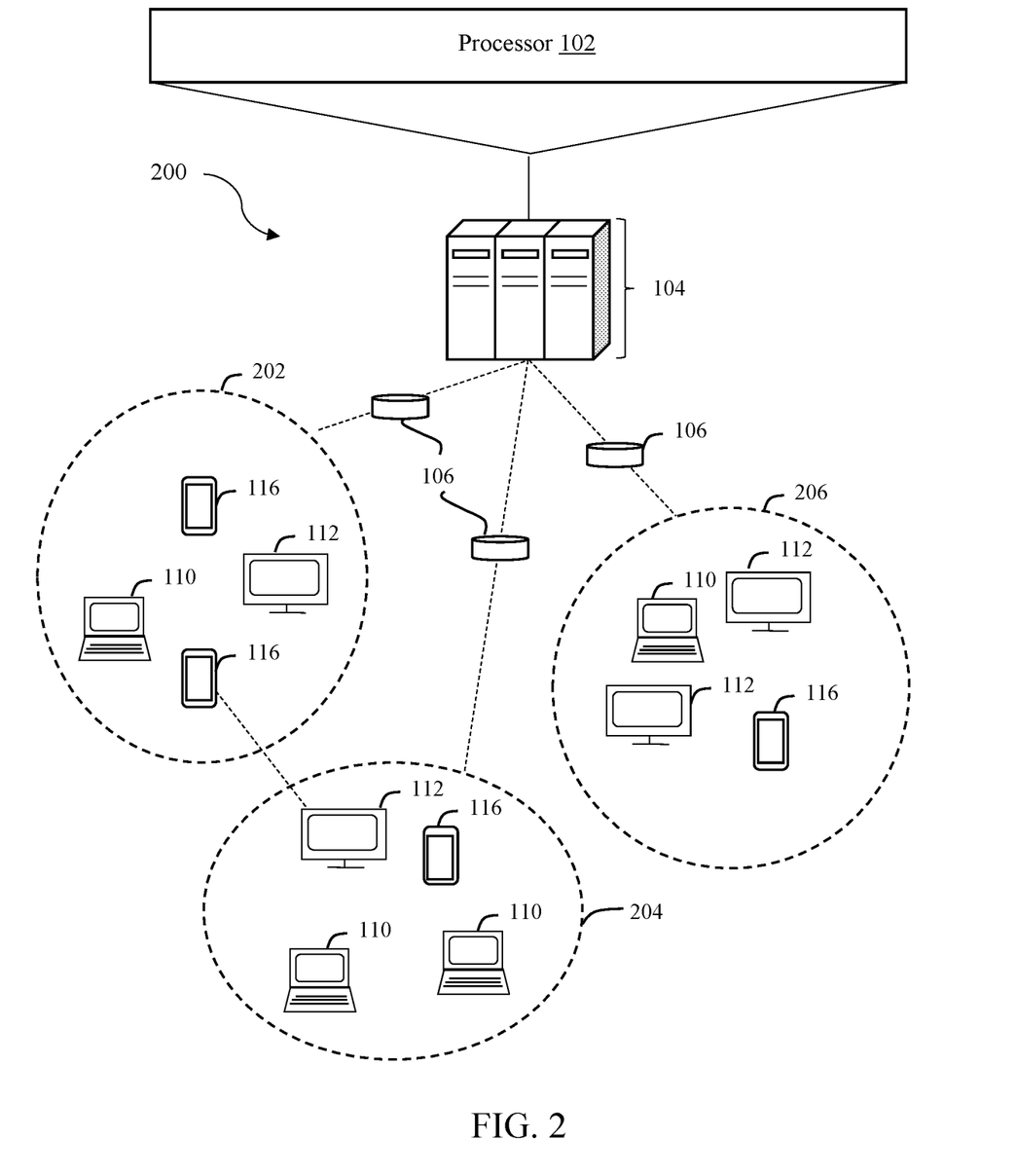
FIG. 2 illustrates a network architecture of a plurality of organizations in accordance with one embodiment.

FIG. 2 illustrates an exemplary network architecture 200 of a plurality of organizations, in which the processor 102 is in communication with or otherwise receives data from organizations 202, 204, and 206. The processor 102 may be in communication with different types of networks such as a wireless personal area network (WPAN), a local area network (LAN), a wide area network (WAN), or the like, wherein each network is associated with an organization. The networks associated with organizations 202, 204, and 206 may be similarly configured to and include similar components as the network 108 of FIG. 1.

Figure 3:
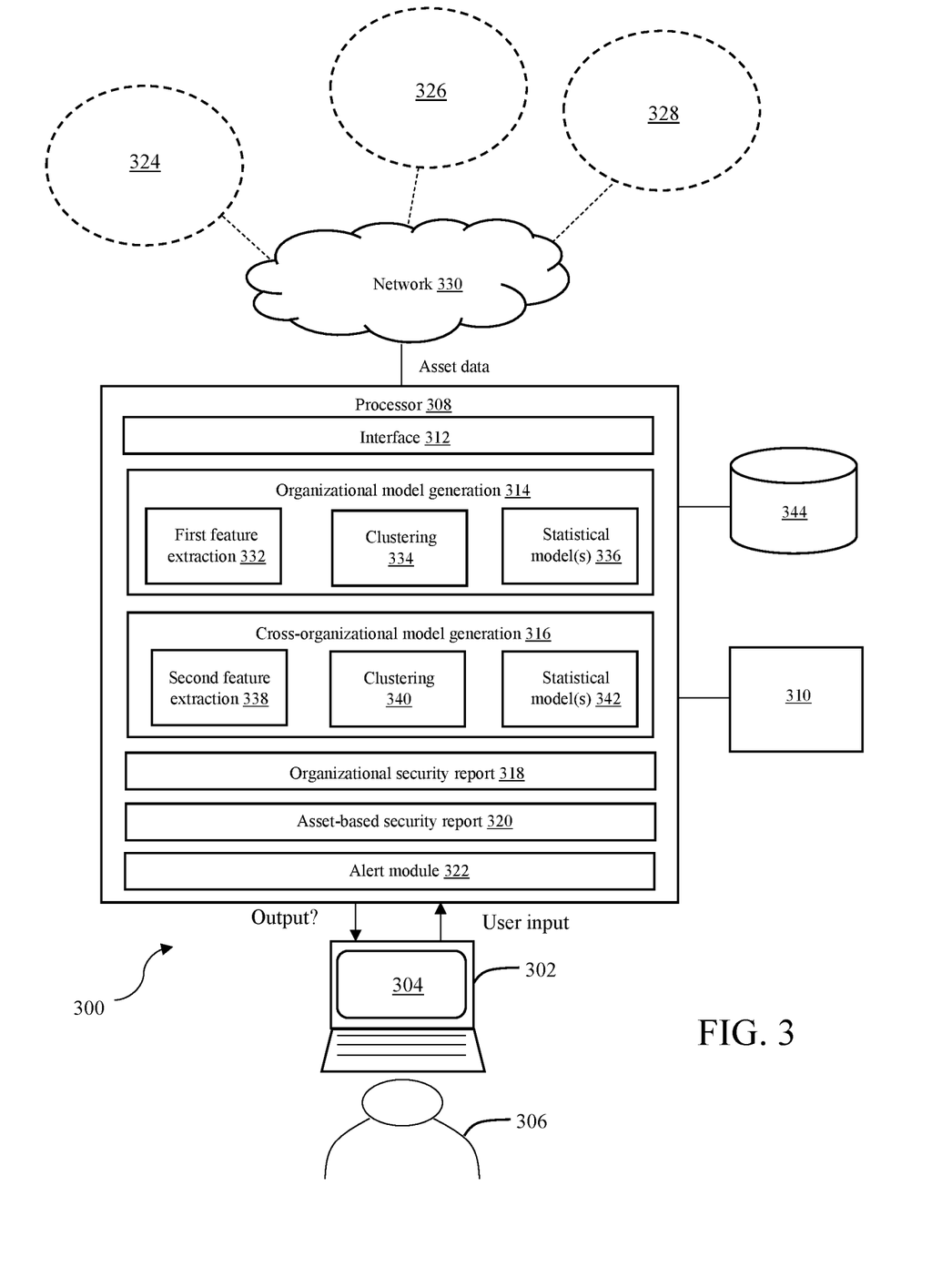
FIG. 3 illustrates a system for identifying assets for review in accordance with one embodiment.

FIG. 3 illustrates a system 300 for identifying assets for review in accordance with one embodiment. The system 300 includes a user device 302 executing a user interface 304 for presentation to one or more users 306 such as security personnel or other users interested in identifying assets on a network that should be reviewed.

The user device 302 may be any hardware device capable of executing the user interface 304. The user device 302 may be configured as a laptop, PC, tablet, mobile device, or the like. The exact configuration of the user device 302 may vary as long as it can execute and present the user interface 304 to the user 306. The user interface 304 may allow the user 306 to supply parameters regarding which organizations or assets should be reviewed and analyze returned data regarding said assets.

The user 306 may include security personnel tasked with ensuring the security of an organization's network (e.g., a network associated with a private company or institution, a governmental body, an educational institution, or the like). Accordingly, the user 306 would want to know which assets on a network were behaving in ways that were anomalous or otherwise different than what is expected.

The user device 302 may be in operable communication with one or more processors 308 such as the processor 102 of FIGS. 1 and 2. The processor(s) 308 may be any hardware device capable of executing instructions stored on memory 310 to accomplish the objectives of the various embodiments described herein. The processor(s) 308 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 308 may be configured as part of the user device 302 on which the user interface 304 executes, such as a laptop, or may be located on a different computing device, perhaps at some remote location.

The processor 308 may execute instructions stored on memory 310 to provide various modules to accomplish the objectives of the various embodiments described herein. Specifically, the processor 308 may execute or otherwise include an interface 312, an organizational model generation module 314, a cross-organizational model generation module 316, an organizational security report module 318, an asset-based security report module 320, and an alert module 322.

The memory 310 may be L1, L2, or L3 cache or RAM memory configurations. The memory 310 may include non-volatile memory such as flash memory, EPROM, EEPROM, ROM, and PROM, or volatile memory such as static or dynamic RAM, as discussed above. The exact configuration/type of memory 310 may of course vary as long as instructions for identifying assets for review can be executed by the processor 308 to accomplish the objectives of various embodiments described herein.

The interface 312 may be in communication with or otherwise receive data from one or more organizations 324, 326, and 328 over one or more networks 330. The organizations 324, 326, and 328 may each be associated with a particular organization and include assets such as those mentioned previously.

The assets associated with the organizations 324, 326, and 328 may have data collection agents running thereon, wherein these assets may communicate or otherwise report data regarding their operation to the processor 308. Additionally or alternatively, the processor 308 may execute one or more asset crawlers to obtain data regarding assets associated with the organizations 324, 326, or 328.

The network(s) 330 may link the various assets and organizations with various types of network connections. The network(s) 330 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34 bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 330 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The processor 308 may include an organizational model generation module 314 to analyze one or more assets of an individual organization. Specifically, the organizational model generation module 314 may generate a model including one or more clusters that are each associated with a particular type of asset.

For example, in operation, the processor 308 may receive asset data related to assets of a first organization (e.g., the organization associated with network 324). A first feature extraction module 332 may extract features from the received asset data that describe the operation of one or more assets of interest.

The extracted features may include any type of data regarding an asset. The features extracted may also depend on the type of asset. The features may include any one or more of software executing on the asset, versions of software executing on the asset, source IP address of a connection, destination IP address of a connection, connection history associated with the asset, duration of a connection involving the asset, ports used, timestamps of connections involving the asset, packet counts to or from the asset, bytes transmitted to or from the asset, services utilized by the asset, etc. This list of features is merely exemplary, and other types of features may be extracted and analyzed in addition to or in lieu of those mentioned above.

Once the appropriate features are extracted, a clustering module 334 may execute instructions stored in memory 310 to implement a clustering algorithm to discover groupings present in the asset data. The clustering module 334 may run a k-means procedure and optimize over the number of clusters. The resulting set of clusters may indicate what the landscape of asset families looks like.

Each cluster may include assets that are more similar to each other in some aspect than they are compared with assets assigned to other clusters. This clustering step may be performed at certain time intervals, such as at the end of each day, at the end of each week, or the like.

Figure 4:
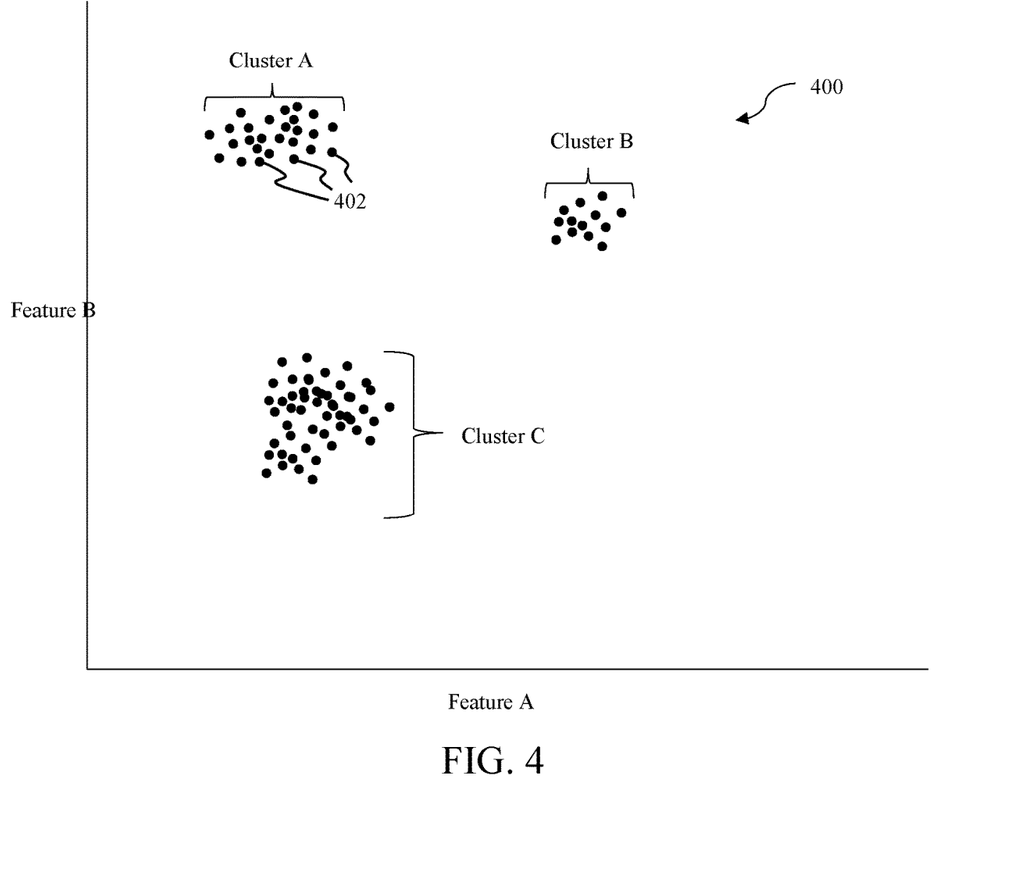
FIG. 4 illustrates a graphical representation of asset clusters in accordance with one embodiment.

FIG. 4, for example, illustrates a graphical representation 400 of asset clusters in accordance with one embodiment. As seen in the graphical representation 400, assets that have features A and B are represented as small black circles 402. Assets that exhibit similar features to others may be grouped together in clusters such as Clusters A, B, and C. In other words, assets that are grouped in Cluster A are more similar to each other than an asset grouped in Cluster B, at least with respect to features A and B.

The clustering module 334 may generate or otherwise update the statistical models 336 at certain, scheduled intervals. These intervals may be at the end of each day (e.g., to show the new assets that were detected that day or if an asset's grouping has changed), hour, week, month, or the like. Additionally or alternatively, the clustering module 334 may generate or update the statistical models 336 after it receives data from a certain number of assets.

The clustering module 334 may generate the set of statistical models 336 (i.e., distributions) based on available agent data and may store it for subsequent report generation. Accordingly, these models essentially represent normal or otherwise expected behavior of the various types of assets associated with an organization.

These models may also include or otherwise designate an asset as a "golden" standard to act as a priority benchmark or baseline to find anomalous conditions. For example, the clustering module 334 may determine the centroid of a particular cluster, and then designate the asset closest to the centroid as the golden standard. In the context of the present application, the term "centroid" may refer to a portion of a cluster in which the majority of the assets are concentrated.

Using the generated statistical models 336, the organizational model generation module 314 can identify a network asset that is anomalous in terms of configuration, behavior, etc. These anomalies may be based on any one of a variety of criteria. In some embodiments, anomalies may be detected by considering cluster population (i.e., the number of assets in each cluster).

For example, an asset's behavior may be so different in one or more aspects from that of other assets in existing clusters that it forms its own cluster. Accordingly, the mere formation of this new cluster may indicate that an asset is anomalous and should be further investigated.

In other embodiments, the organizational model generation module 314 may identify anomalies by first applying a distance function to each cluster, and then identifying a cluster with an outlier distance function value. For example, FIG. 5 illustrates a graphical representation 500 of clusters D, E, and F.

An applied distance function may detect or otherwise recognize clusters that are the furthest away from others. In FIG. 5, for example, clusters D and E are close to each other, but cluster F is shown as much further away than either cluster D or E. The distance function may therefore calculate distance DE (the distance from cluster D to cluster E), distance DF (the distance from cluster D to cluster F), and distance EF (the distance from cluster E to cluster F). If the distance between two clusters is greater than some threshold, one of or both of the clusters (i.e., the assets associated therewith) can be flagged for further review. The distance may be measured from, for example, the assets that are closest to each other from different clusters, assets that are farthest from each other from different clusters, the centroids of the clusters, etc.

Figure 5:
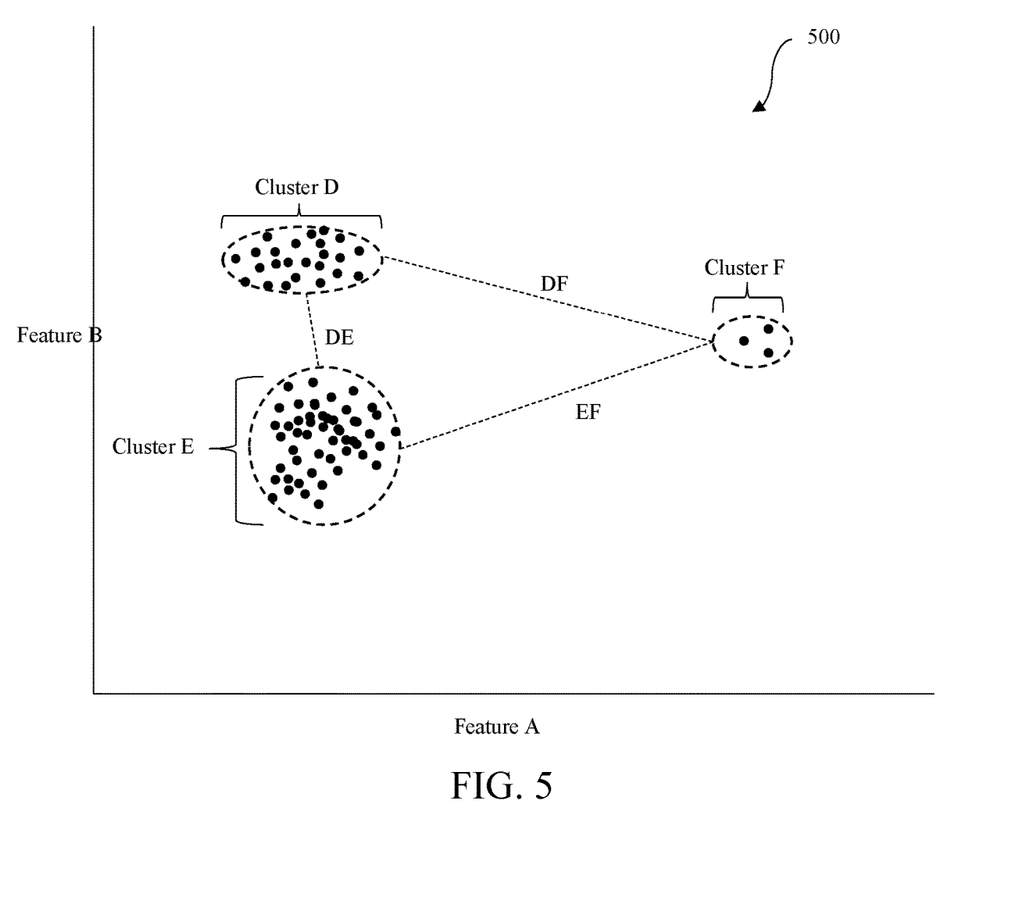
FIG. 5 illustrates a graphical representation of clusters in accordance with another embodiment.

Referring to FIG. 5, the organizational model generation module 314 may determine that distance DF is significantly more than distance DE. The organizational model generation module 314 may also determine that distance EF is significantly more than distance DE. From this information, the organizational model generation module 314 may determine that cluster F is an outlier and therefore includes anomalous assets that should be flagged for further review.

In other embodiments, the organizational model generation module 314 may similarly apply a function that determines the distance between an asset and the centroid of its associated cluster. The organizational model generation module 314 may flag an asset whose distance from its cluster's centroid is greater than some threshold. Similarly, the organizational model generation module 314 may flag an entire cluster if the cluster has one or more assets at a distance from the centroid that is greater than some threshold.

Upon detecting that an asset is behaving anomalously, the alert module 322 may issue an alert to a user 306 via the user interface 304. This alert may be a visual alert, an audio alert, a text alert, a haptic-based alert, or some combination thereof. The user 306 may then investigate the cause of the alert and perform any threat mitigation procedures or other actions. Additionally or alternatively, these remedial actions may be implemented autonomously.

In addition to or in lieu of merely reviewing the cause of the alert, the user 306 may provide feedback regarding the asset and the generated alert. For example, the user 306 may review the associated data and decide that the behavior is benign or otherwise not an actual cause for concern. The provided feedback may be used to continually improve the generated models.

The above discussion is related to analyzing assets within a single organization. However, various embodiments may also consider data regarding assets from other organizations.

Accordingly, and referring back to FIG. 3, the cross-organizational model generation module 316 may similarly build a statistical model representing the behavior of assets associated with different organizations 326 and 328.

The cross-organizational model generation module 316 may include a second feature extraction module 338, a second clustering module 340, and one or more statistical models 342 regarding assets associated with one or more organizations. These components may operate similarly to the components of the organizational model generation module 314.

The cross-organizational model generation module 316 may rely on continuously-received asset data from the organizations 326 and 328, as well as data from one or more databases 344. The generated cross-organizational models 342 may be quite different from each other based on the type of organization they represent. For example, assets and their behavior for one type of organization (e.g., a law firm) may be considerably different than assets for another type of organization (e.g., an accounting firm).

Analyzing the cross-organizational statistical model(s) 342 may be beneficial in a variety of scenarios. Mature organizations likely have a stable configuration of assets on their network and know how these assets should behave. For example, well known healthcare companies that have been in existence for several years likely know how to structure their networks and how to configure assets thereon. Accordingly, these types of mature organizations may have achieved a pseudo-optimal set of software or have chosen to configure firewalls in a certain way adapted to their business needs.

Younger companies, on the other hand, may be unfamiliar with best practices or be unsure how to best configure their network. Accordingly, these younger companies may use the cross-organizational statistical model(s) 342 as a gauge to see how their practices compare to the rest of their industry. For example, a user 306 associated with this type of company or organization may be alerted if an asset on his or her organization's network is behaving differently than what is expected based on assets of similar, but more established organizations.

The second clustering module 340 may similarly group like assets (even those associated with different organizations) into clusters as in FIGS. 4 and 5. The anomalous detection techniques discussed above may similarly be applied to clusters of assets associated with different organizations.

The organizational security report module 318 may generate a report regarding the security posture of a particular organization or an asset associated therewith. The organizational security report module 318 may also make decisions regarding which instances of asset behavior should be emphasized and which instances of asset behavior should be de-prioritized.

Some types of detected behavior, while unusual, may not necessarily be a cause for concern. For example, the fact that an asset is executing a popular program such as ADOBE ACROBAT READER may be unusual for that type of asset, but it may not constitute a security problem to be highlighted for the user 306. Accordingly, the organizational security report module 318 may be configured to de-prioritize this type of anomaly and not issue an alert to the user 306. One or more databases 344 may store data regarding acceptable programs or software that, if detected, would not give rise an anomalous alert (even if the program or software were unusual for a particular type of asset).

On the other hand, the organizational security report module 318 may be configured to emphasize certain instances of anomalous behavior. For example, if an asset started transmitting an abnormally large amount of data as compared to other, similar types of assets, it may be indicative of an exfiltration attempt that should be immediately addressed. In these situations, the timing of the data transfer may be considered as well to determine whether the activity truly is anomalous.

The organizational security report module 318 may also output a list of the most and least frequently installed software and configurations in each of the clusters, along with an indicator of the security posture through the number of anomalous assets flagged. The clustered groups may be presented to the user 306 as well, such as in the format of FIGS. 4 and 5.

The asset-based security report module 320 may similarly, for each asset within an organization, run it against its associated organization's statistical model to highlight anomalies. The asset-based security report module 320 may similarly generate a report for subsequent review by the user 306. The generated report may highlight, for example, any anomalous software installations or configurations, and include a summary of installed assets on the network. Software installations or system configurations with anomalies below pre-defined thresholds may filter up in priority if the cross-organizational models support the assessment that they are anomalous.

Figure 6:
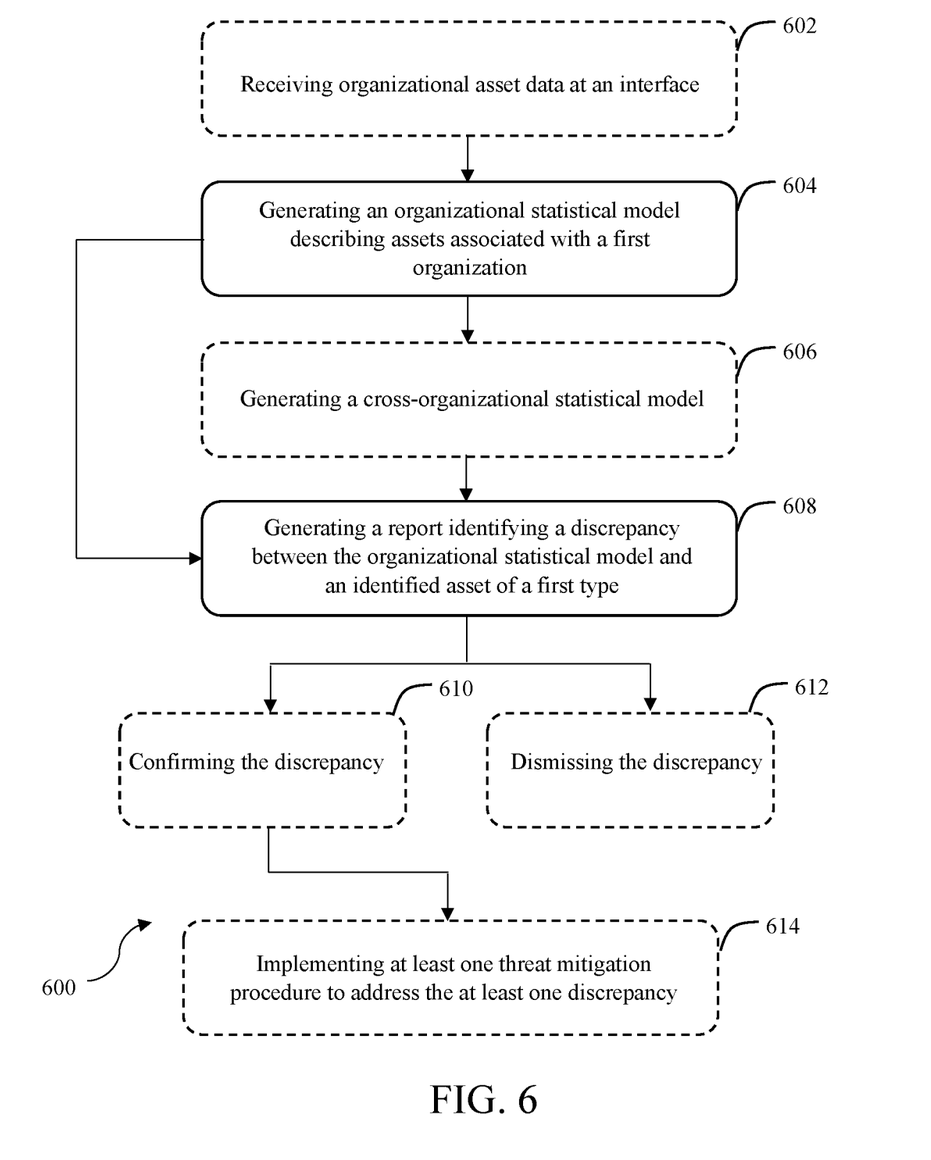
FIG. 6 depicts a flowchart of a method of identifying assets for review in accordance with one embodiment.

FIG. 6 depicts a flowchart of a method 600 of identifying assets for review in accordance with one embodiment. The system 300 of FIG. 3 or the components thereof may perform the steps of method 600.

Step 602 involves receiving organizational asset data at an interface. This organizational asset data may relate to the assets on an organization's network and data regarding the configuration and operation of the assets.

Step 604 involves generating, using a processor executing instructions stored on memory, an organizational statistical model describing assets associated with a first organization, wherein the organizational statistical model includes at least one cluster associated with a plurality of assets of a first type. The organizational model generation module 314 of FIG. 1 may perform this step.

The generated model(s) may group similar types of assets together in clusters as discussed previously. For example, the "type" of asset may refer to the fact that an asset is a laptop associated with an employee in an organization's accounting department. The assets may be further grouped based on, for example, their executing software and version(s) thereof.

Step 606 is optional and involves generating, using the processor, a cross-organizational statistical model, wherein the cross-organizational statistical model describes a plurality of assets having a plurality of asset types and associated with a plurality of organizations. Similar to the organizational statistical model, the cross-organizational statistical model may describe assets associated with a plurality of different organizations. These assets associated with the plurality of different organizations may be similar to the assets of the first organization.

Step 608 involves generating, using the processor, a report identifying a discrepancy between the organizational statistical model and an identified asset of the first type associated with the first organization. As discussed above, the processor may recognize when an asset behaves in a way that is unexpected or otherwise is anomalous. For example, an asset may behave in a way that is so different than what is expected that it forms its own cluster (see FIGS. 4 and 5). Accordingly, the processor may generate a report identifying this discrepancy for review by a user.

Step 610 involves confirming the discrepancy based on a comparison between the identified asset of the first type and the cross-organizational statistical model. Accordingly, the confidence of the detection of the discrepancy may be increased based on an analysis of the cross-organizational statistical model (i.e., by comparing the asset of the first organization with assets of a plurality of other organizations).

Step 612 involves dismissing the discrepancy based on a comparison between the identified asset of the first type and the cross-organizational statistical model. In some embodiments, the processor may dismiss a discrepancy if the discrepancy is benign or otherwise not a cause for concern as discussed previously.

Step 614 involves implementing at least one threat mitigation procedure to address the at least one discrepancy. The fact that an asset is behaving in a way that is unexpected or otherwise anomalous may indicate at least potential risk of malicious activity. Accordingly, upon detecting a discrepancy, a processor such as the processor 308 of FIG. 3 may implement a threat mitigation procedure. For example, the processor 308 may quarantine the asset under analysis such that it does not communicate with other assets on a network. In some embodiments, the asset may be placed on a blacklist or labeled with some other designation indicating it should be monitored closely.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
performing, by one or more computer systems:
receiving organizational asset data of a first organization, wherein the organizational asset data includes data regarding a plurality of assets of different types;
generating an organizational statistical model for the first organization by applying a clustering machine learning algorithm to the organizational asset data to cluster the plurality of assets into clusters according to respective types of the assets;
receiving cross-organizational asset data of a second organization, wherein the cross-organizational asset data includes data regarding a plurality of assets of different types associated with at least the second organization;
generating a cross-organizational statistical model associated with the second organization by applying the clustering machine learning algorithm to the cross-organizational asset data to cluster the plurality of assets of the second organization according to respective types of the assets of the second organization;
comparing the organizational statistical model with the cross-organizational statistical model to detect a discrepancy between a first asset of the first organization and a second asset of the second organization, wherein the second asset is in a second cluster associated with an asset type, and the first asset is in a first cluster associated with the same asset type; and
outputting a report summarizing the detected discrepancy.

2. The method of claim 1, wherein
the discrepancy indicates that the second asset behaved in an unexpected or anomalous manner for assets of the asset type.

3. The method of claim 1, wherein
the discrepancy is indicated as a security alert was observed for the second asset that is statistically unexpected or anomalous for assets of the asset type.

4. The method of claim 1, wherein
the cross-organizational statistical model is generated based on statistical data of at least some of the organizational asset data of the first organization.

5. The method of claim 1, further comprising the one or more computer systems:
receiving additional organizational asset data of the first organization, and in response:
updating the organizational statistical model based on the additional organizational asset data; and
updating the cross-organizational statistical model based on the additional organizational asset data.

6. The method of claim 1, wherein
the cross-organizational statistical model is continuously updated based on additional organizational asset data of a plurality of organizations that are associated with a same industry.

7. The method of claim 1, wherein
the asset type is a classification of assets based on one or more of:
whether a particular asset is a laptop,
whether a particular asset is a mobile device,
one or more types of software installed on the particular asset,
one or more configuration settings of the particular asset,
a connection history of the particular asset, and
one or more ports used by the particular asset, and
a packet count or bytes transmitted to or from the particular asset.

8. The method of claim 1, wherein
the asset type is defined based on one or more golden standard assets of the asset type.

9. The method of claim 8, wherein
the report is a security report outputted via a graphical user interface (GUI) of the security monitoring system, wherein the GUI is generated on a computer system remote from a first network of the first asset and a second network of the second asset.

10. The method of claim 1, wherein
one or more computer systems are part of a security monitoring system configured to monitor respective security postures of a plurality of networks of a plurality of organizations.

11. The method of claim 10, wherein
the discrepancy is indicated as a visual alert, and the method further includes performing one or more threat mitigation procedures on the second asset or the second network according to user input received via the GUI.

12. The method of claim 11, further comprising display, via the GUI, a graphical representation of a set of clusters generated by the clustering machine learning algorithm including the first cluster and the second cluster, wherein the graphical representation indicates respective distances among the clusters determined using a distinct function.

13. The method of claim 10, further comprising receiving, via the GUI, user feedback indicating to confirm the discrepancy or dismiss the discrepancy.

14. A system comprising:
one or more computer systems comprising one or more hardware processors, wherein the one or more hardware processors are configured to:
receive organizational asset data of a first organization, wherein the organizational asset data includes data regarding a plurality of assets of different types;
generate an organizational statistical model for the first organization by applying a clustering machine learning algorithm to the organizational asset data to cluster the plurality of assets into clusters according to respective types of the assets;
receive cross-organizational asset data of a second organization, wherein the cross-organizational asset data includes data regarding a plurality of assets of different types associated with at least the second organization;
generate a cross-organizational statistical model associated with the second organization by applying the clustering machine learning algorithm to the cross-organizational asset data to cluster the plurality of assets of the second organization according to respective types of the assets of the second organization;
compare the organizational statistical model with the cross-organizational statistical model to detect a discrepancy between a first asset of the first organization and a second asset of the second organization, wherein the second asset is in a second cluster associated with an asset type, and the first asset is in a first cluster associated with the same asset type; and
output a report summarizing the detected discrepancy.

15. The system of claim 14, wherein
the discrepancy indicates that the second asset behaved in an unexpected or anomalous manner for assets of the asset type.

16. The system of claim 14, wherein
the discrepancy is indicated as a security alert was observed for the second asset that is statistically unexpected or anomalous for assets of the asset type.

17. The system of claim 14, wherein
the cross-organizational statistical model is generated based on statistical data of at least some of the organizational asset data of the first organization.

18. The system of claim 14, wherein the one or more computer systems are configured to:
receive additional organizational asset data of the first organization, and in response:
updating the cross-organizational statistical model based on the additional organizational asset data.

19. The system of claim 14, wherein the asset type is a classification of assets based on one or more of:
whether a particular asset is a laptop,
whether a particular asset is a mobile device,
one or more types of software installed on the particular asset,
one or more configuration settings of the particular asset,
a connection history of the particular asset, and
one or more ports used by the particular asset, and
a packet count or bytes transmitted to or from the particular asset.

20. The system of claim 14, wherein
one or more computer systems are part of a security monitoring system configured to monitor respective security postures of a plurality of networks of a plurality of organizations.

21. The system of claim 20, wherein
the report is a security report outputted via a graphical user interface (GUI) of the security monitoring system, wherein the GUI is generated on a computer system remote from a first network of the first asset and a second network of the second asset.

* * * * *